Dec. 23, 1941.  L. AMBROSE  2,266,727
BRAKE
Filed May 25, 1940  4 Sheets-Sheet 1

INVENTOR
LOUIS AMBROSE
BY William T Kniemer
ATTORNEY

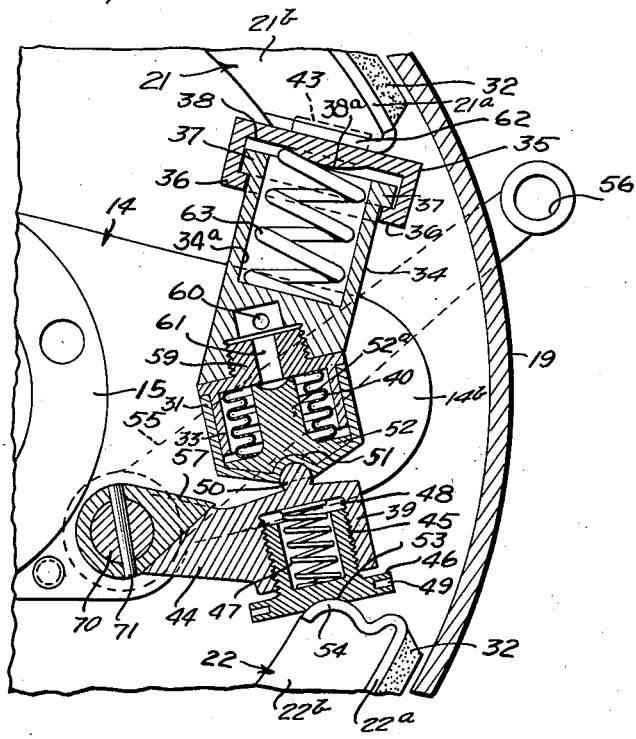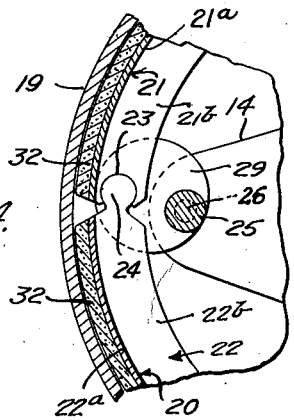

Dec. 23, 1941.   L. AMBROSE   2,266,727
BRAKE
Filed May 25, 1940   4 Sheets-Sheet 3
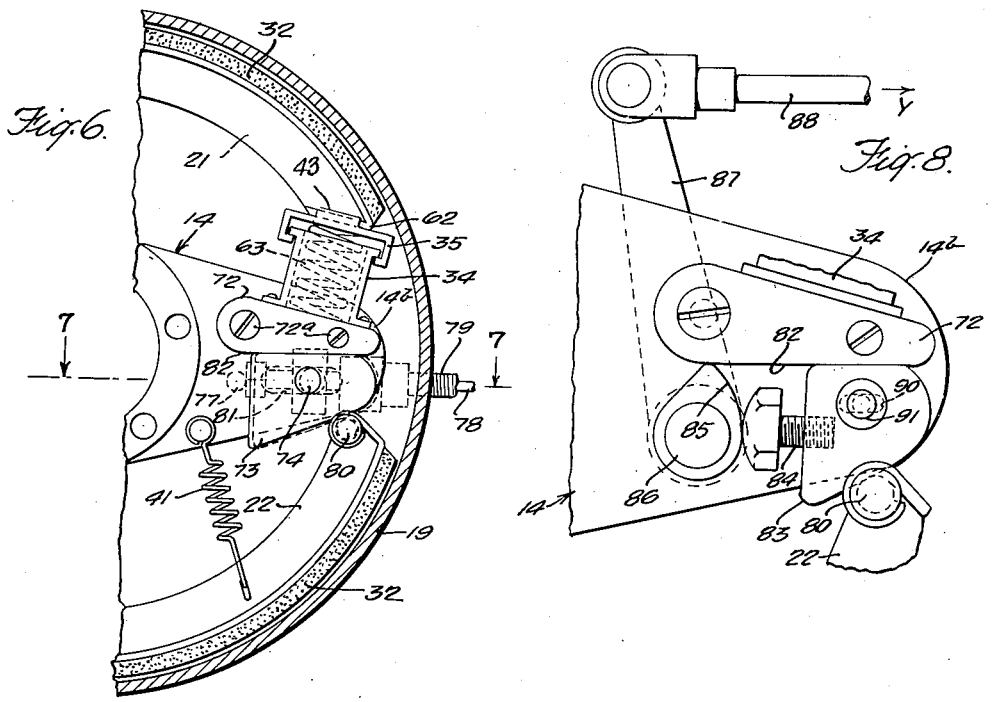
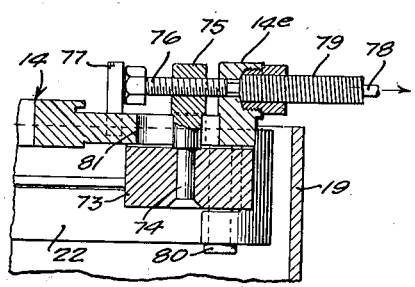
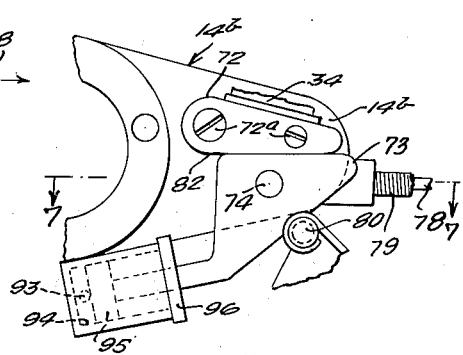
INVENTOR
LOUIS AMBROSE.
BY
William T. Kiesner
ATTORNEY

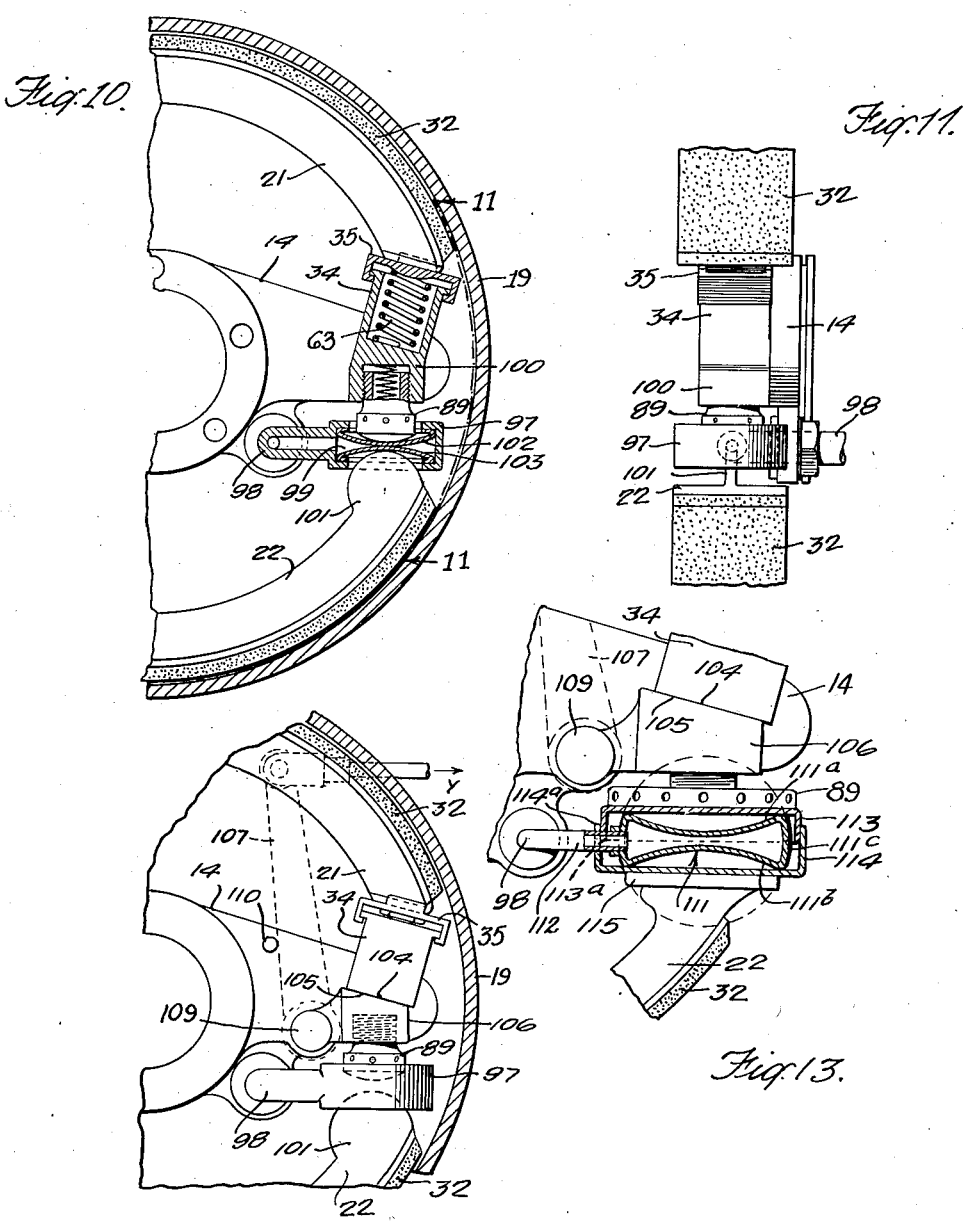

Patented Dec. 23, 1941

2,266,727

UNITED STATES PATENT OFFICE 2,266,727

BRAKE

Louis Ambrose, New York, N. Y., assignor, by direct and mesne assignments, of one-third to Aldo M. Franchi, New York, one-third to John J. Seroska, Woodside, Long Island, and one-third to Anthony V. Stone, Jackson Heights, N. Y.

Application May 25, 1940, Serial No. 337,189

32 Claims. (Cl. 188—152)

This invention relates to brake construction, particularly brakes of the kind to be used for airplane and vehicle wheels, and the like.

This application is a continuation in part of my application Serial No. 265,824, filed April 3, 1939.

One of the objects of this invention is to provide an efficient brake construction that will be of simple, inexpensive and dependable construction. Another object is to provide a brake in which the various parts are of strong and durable construction and capable of rapid and inexpensive assembly or disassembly. Another object is to provide a brake construction to the interior parts of which access may be speedily and readily gained for purposes such as inspection, adjustment, replacement of parts, and the like.

Another object is to provide a brake of simple and dependable construction and capable of so modifying the effect of externally controlled brake-applying forces as will avoid the danger of initial locking of the rotating part or wheel and as will insure safe and dependable deceleration. Another object is to provide a brake construction of the just-mentioned character that will be inexpensive and simple to construct and maintain, foolproof in assembly, construction and operation, and of dependable, consistent and uniform action under the varying conditions of practical use. Another object is to provide a brake construction of the just-mentioned character that will be capable of wide flexibility and convenience in method or means for effecting application of the externally controlled braking force or forces, while maintaining ease of access to the internal brake parts, and ease of assembly or disassembly thereof.

Another object is to provide a brake mechanism of the above-mentioned character which will dependably ease off or modify in decreasing direction the actual braking effort in response to the external brake-applying force or forces so that commencement of the braking action does not take place with such suddenness as to effect locking of the rotating part or wheel. Another object is to carry out this last-mentioned object by a mechanism of inexpensive, simple and dependable construction and action.

Another object is to provide a brake construction in which the brake shoe structure can be readily and quickly removed, as for inspection or replacement of the brake lining material, and replaced with speed and ease. Another object is to provide a brake construction in which the brake shoe structure may be made up of a number of brake shoes and in which the mounting and guiding of the latter and relationship thereof to the other parts of the brake are such as to make for inexpensiveness of construction, ease and facility of assembly or disassembly and uniformity and dependability of braking action. Another object is in general to improve upon the construction and action and control of brakes for rotating parts, such as vehicle or airplane wheels, and the like. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings in which are shown, by way of illustration, several of the various possible embodiments of my invention, Figure 1 is a front elevation of a brake structure as seen from the wheel side thereof, certain parts being omitted and certain parts being broken away or shown in section, as seen along the line 1—1 of Figure 2;

Figure 3 is a vertical sectional view on an enlarged scale of part of the structure as seen along the line 3—3 of Figure 2;

Figure 4 is a view on a larger scale of a part of the construction as seen along the line 4—4 of Figure 2;

Figure 5 is a rear elevation on a smaller scale, certain parts being omitted, more particularly as seen from the rear of Figure 1 or Figure 2;

Figure 6 is a view like that of Figure 3 showing another form of actuating mechanism;

Figure 7 is a horizontal sectional view along the line 7—7 of Figure 6;

Figures 8 and 9 are fragmentary front elevations of modified forms of actuating mechanisms;

Figure 10 is a view like that of Figure 3, showing another form of fluid-operated actuating means;

Figure 11 is an elevation as seen from the right in Figure 10 along the line 11—11;

Figure 12 is a view like that of Figure 10 showing the incorporation with the fluid-actuated mechanism of Figure 10, of another form of actuating means, and Figure 13 is a view like that of Figure 10 with certain parts omitted, showing certain details of the fluid-actuated mechanism.

Similar reference characters refer to similar parts throughout the several views of the drawings.

Figure 1:
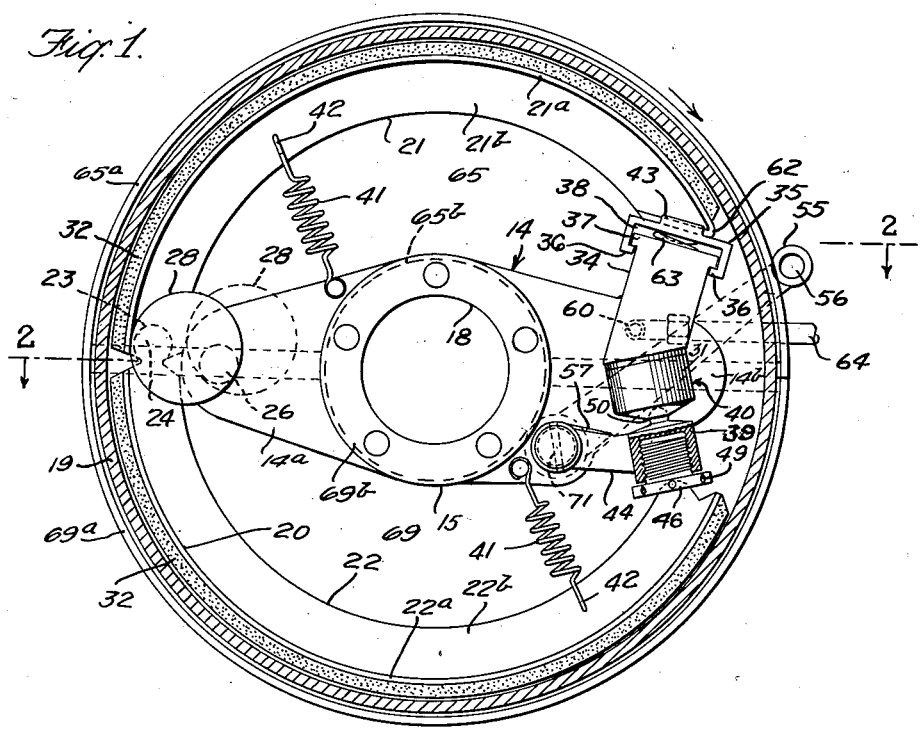
Figure 2:
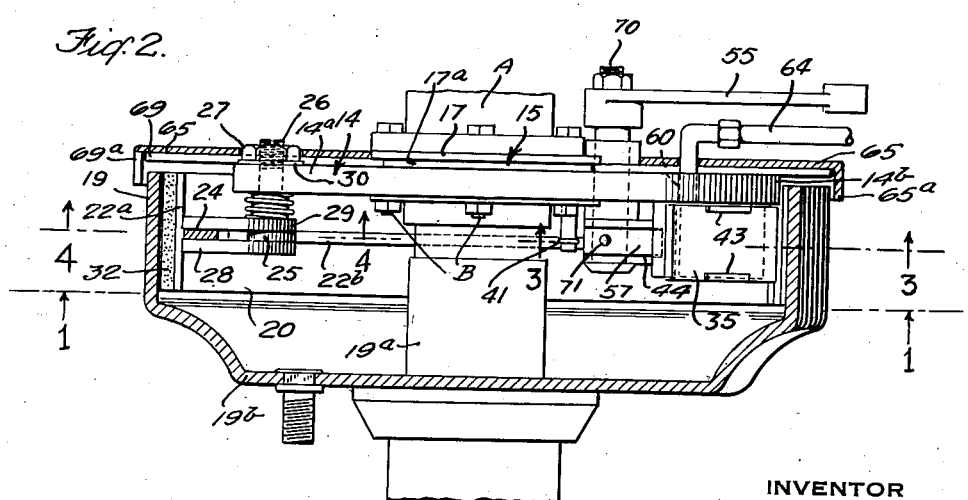
Figure 2 is a sectional view as seen along the line 2—2 of Figure 1.

Referring more particularly to Figures 1 and 2, I provide a brake drum 19 secured in any suitable way to the rotating part, such as a wheel (not shown); illustratively, the drum 19 may be secured to a hub 19a in any suitable manner, as by suitable spoke-like means or a disk part 19b, which may be integral with the drum. Hub 19a is rotatably supported by suitable bearing means on an internal stud shaft or equivalent means, or the like, which is not shown and which may be of any conventional construction and which has suitable support in and by a rigid or non-rotating part of the vehicle indicated in Figure 2 by the reference character A. In the illustrative form of Figure 2, the part 19b may be considered as suitably constructed to have bolted thereto a disk form of wheel, and where part 19b is in the form of spokes, the disk of the wheel thus closes the front end of the brake drum 19.

To the non-rotating part A I secure in any suitable manner a frame 14 which I preferably make up in strong plate-like form, with a hub 15 and preferably two diametrically opposed mounting portions 14a and 14b extending toward respectively diametrically opposed portions of the brake drum 19. The hub 15 is constructed in any suitable way to facilitate its rigid attachment to the part A and preferably it has a central opening 18 whereby it may be sleeved onto a suitable extension (not shown) of the part A, the latter being flanged, as is better shown in Figure 2, and the hub 15 being suitably apertured so that the frame part may be rigidly clamped to the part A as by bolts B.

The outer face of the plate-like frame part 14 is preferably parallel to the plane of the free edge of the brake drum 19 and the relationship is preferably such that the former is somewhat displaced away from the latter, as is better shown in Figure 2, hub 15 preferably extending axially away from that outer face of the member 14 and having a flange 17 spaced from the face of part 14 so as to provide an annular groove 17a therebetween, for a purpose later described.

Related to the inside cylindrical face of the drum 19 is a brake shoe structure generally indicated by the character 20 and which preferably comprises a plurality of serially arranged shoes, illustratively two in number, as shown at 21 and 22; the brake shoe structure is preferably of an extent as close to 360° as is possible and where it is in two segments or two brake shoes, each of them approximates 180° in extent. In transverse cross-section the brake shoe structure is preferably T-shaped; thus, brake shoe 21 has a flange part 21a of a width commensurate with the width of the brake drum 19 and an internally extending and preferably centrally positioned web 21b. Brake shoe 22 has similar counterparts, as shown at 22a and 22b. Both brake shoes are provided with suitable brake-lining material, as shown at 32 (Figures 1 and 2) secured thereto in any usual or suitable manner.

The brake shoe structure I preferably mount and relate to other parts of the mechanism in a manner to facilitate quick assembly or disassembly. As better shown in Figures 1, 2 and 3, the right-hand part 14b of the rigid or non-rotating frame 14 has suitably secured to it, as by welding, or integrally formed therewith, and preferably at the inner face thereof, a member 34 which extends upwardly toward the inner face of the brake drum 19 and preferably at a suitable inclination, somewhat as shown in the drawings; in horizontal cross-section the member 34 may be four-sided, approximating a square, and at its upper end is provided with suitable means to form a seat for one end of the brake shoe structure and in the illustrative embodiment for the right-hand end of the brake shoe 21. Preferably, the seat for this end of the brake shoe structure is constructed to be yieldable and to guide the end of the brake shoe structure for physical displacement into engagement with the internal cylindrical face of the brake drum 19, for purposes and coactions later described in detail. A preferred and convenient form of construction comprises a seat member 35 that extends across the upper end of the member 34 and that is provided with two spaced upstanding flanges 43 (Figures 2 and 3) between which is received a plate-like end member 62 of the brake shoe 21, end plate member 62, as is better shown in Figures 1 and 3, extending at an acute angle to the tangent at the point where the plate member 62 joins the flat rim or flange part 21a of the brake shoe. End plate 62 may be conveniently formed by bending an end portion of the band or flange part 21a inwardly against the severed end of the web 21b, the line of severance of the latter being at the above-mentioned acute angle, and the web itself thereby backing up or supporting the bent-over flange portion, thus to provide the flat plate-like member 62, as above-mentioned.

The member 35 presents an upper flat face against which the end plate 62 rests and along which that end of the shoe may slide, being guided by the spaced upstanding flanges 43. Member 35 is supported by the member 34 so that its upper face makes an acute angle with the internal face of the drum 19 substantially equal to the above-mentioned acute angle and for that purpose I prefer that the member 34 have a suitable inclination away from the vertical, as earlier mentioned and as shown in Figures 1 and 3.

Preferably, also, seat member 35 is mounted so that it may yield and partake of bodily movement in response to a certain pressure exerted against it by the brake shoe structure, such as the above-mentioned end of the brake shoe 21. Thus, I prefer to bore out the member 34, as at 34a, to form an internal seat or housing for a helical spring 63 whose upper end bears against the under face 38 of the seat member 35 and urges the latter in a general upward direction to an extent preferably limited in some suitable way; preferably, member 34 has on two opposed faces and preferably at its upper end external ribs or flanges 37 under which engage the internal flanges or ribs 36 formed in the seat member 35 as at the ends of two opposed depending side flanges thereof, as is better shown in Figures 1 and 3.

This preferred form of limiting means I preferably utilize also to facilitate quick assembly or disassembly of the parts. Thus, the under face 38 of the seat member 35 is preferably provided with a central downwardly projecting rounded abutment 38a about which the end turn of the helical spring 63 may engage. Thus, in assembly, spring 63 is inserted into the bore 34a, is compressed by a suitable tool to bring its upper end below the upper end face of the member 34, and then the seat member 34 is slid crosswise onto the upper end of the member 34 with the ribs or flanges 36, 36 engaging in under the ribs 37, 37; when properly positioned in a position to close over the bore 34ª, the curved depending projection 38ª finds itself cammed into the inside of the upper end turn of the spring 63 which thereafter, due to its force of expansion, holds the seat member 35 against sliding movement relative to member 34 and also holds it in uppermost position, as seen in Figures 1 and 3.

The other end of the brake shoe structure, being the right-hand end of the brake shoe 22, as viewed in Figures 1 and 3, I also and preferably provide with a suitable seat also carried in the right-hand end part 14ᵇ of the frame member 14. Thus, by suitably cutting the web 22ᵇ and bending against its curved face an end portion 54 of its band or flange part 22ª, as better appears from Figure 3, I provide a curved end plate 54 well backed up by the web 22ᵇ and thus well adapted to coact with a concave recess or seat 53 formed in a seat member 46 carried by the frame part 14, preferably adjustably, and preferably, also, movably so as to be movable and controllable, in preferred and illustrative manners hereinafter described, to exert suitable force upon the end of the brake shoe structure in a general downward direction, as viewed in Figure 3, thus to press the brake shoe structure against the inside face of the drum 19.

At the opposite end part 14ª (Figures 1, 2 and 4) of the frame member 14, I provide displaceable means for coacting with the brake shoe structure preferably to achieve a number of coactions and advantageous results. Thus, where the brake shoe structure is sectionalized, illustratively into the two brake shoes 21 and 22, I provide a readily connectable and disconnectable connection between the adjacent ends of the brake shoes, and arrange the just-mentioned displaceable means to coact with such connection. As is better shown in Figure 4, the web 22ᵇ of brake shoe 22 extends beyond the terminus of the flange part 22ª and this extension is shaped to provide a male connecting element 24 that presents an external cylindrical surface of an extent closely approximating 360°, thus forming a head-like part joined to the web 22ᵇ by a smaller dimensioned neck-like part. The adjacent end of the succeeding brake shoe 21 has its web 21ᵇ cut away, as at 23, to form a female connecting part presenting an internal cylindrical surface of the same radius as that of the part 24 but of a lesser circumferential extent than the latter, but greater than 180°. Part 24 may thus be entered into or removed from the part 23 upon relative lateral displacement between the two, and thus the two brake shoes may be readily connected or disconnected. When connected, however, the junction between the two brake shoes is double-acting in that a push or pull of one brake shoe, in the general direction of its arcuate extent, is transmitted to the other and preferably the parts are dimensioned so that there is absence of play therebetween.

Accordingly, the brake shoe structure is readily inserted into or removed from the brake structure. Thus, brake shoe 22 may be slipped into place through an open end of the brake drum 19 to bring its bearing plate end 54 into the seat 53 of the seat member 46 (Figures 1 and 3) and by a similar operation brake shoe 21 is slipped through an open end of the drum 19 to bring its bearing plate 62 against the seat member 35 and in between the two spaced guide flanges 43. The adjacent ends of the two brake shoes are then interconnected, it being noted that the connecting elements 24, 23 effect such a connection by a simple relative lateral displacement between the two adjacent ends of the brake shoes, a displacement which need not be, it will be seen, more than the thickness of the web of the brake shoes.

Where two brake shoes are employed, the frame part 14, or more specifically the left-hand extension 14ª thereof, is positioned to terminate adjacent the junction 23—24 between the adjacent ends of the brake shoes, and carried by the part 14ª and positioned to coact with the junction 23—24 are two spaced members 28, 29 (Figures 1, 2 and 4) preferably taking the form of plates rigidly carried by a pin or stud shaft 26 but spaced apart as by a spacer 25 by a distance equal to the thickness of the webs 21ᵇ and 22ᵇ of the two brake shoes. Stud 26 is mounted in the part 14ª of the frame 14 so as to position the spaced plates 28, 29 with the space therebetween alined with the intended position of the brake shoe webs and preferably I utilize stud 26 to effect a displacement, preferably of both of the plates 28, 29, into or out of operative relation to the brake shoe webs.

For this latter purpose, the pin 26 is preferably pivotally supported in a suitable hole in the part 14ª of the frame 14, pin 26 being preferably shouldered, as shown in Figure 2, in order properly to space the spaced members 28, 29 from the inner face of the frame 14. The outer end of stud 26 is preferably threaded to receive a nut 27 between which and the outer face of frame 14 I preferably provide a suitable spring washer 30; with such an arrangement, nut 23 may be tightened up to compress the spring washer 30 sufficiently to effect a gripping of the frame 14 so that, by applying a wrench to the nut 23, which may be locked against rotation relative to the stud 26 as by a cotter pin, or the like, stud 26 with the spaced plates 28, 29 rigidly mounted thereon may be turned as an entity and frictionally held in whatever position it is turned to. In the illustrative embodiment, the plate members 28—29 are conveniently in the form of disks with the connection thereof to the stud 26 at a point displaced from the center. Accordingly, in effecting assembly, as above described, and upon completing of the mating of the connecting parts 23, 24, spaced elements 28, 29, having theretofore occupied the broken line position shown in Figure 1, are swung by suitably rotating the stud 26 into the full line position shown in Figures 1, 2 and 4, thus bringing the two plates astride of the adjacent connected ends of the brake shoes, each to one side of the joined end portions of the webs 21ᵇ and 22ᵇ and thus holding the webs against relative lateral displacement and hence preventing the connection 23—24 from becoming disconnected.

As shown in Figure 2, the adjacent ends of the two brake shoes relatively snugly fit in between the spaced plates 28, 29 and the latter thus also fix the position of the left-hand portion of the brake shoe structure 21—22 and aline it properly with the right-hand end portions thereof, the positions of the latter in the direction of the axis of the brake drum being determined by the seat members 35 and 46. Thus, the entire brake shoe structure is alined in a way to insure that the axis of the generally cylindrical braking surface of the brake shoe structure is coincident with the axis of the internal cylindrical surface of the brake drum 19. Moreover, the spaced plates 28, 29 also coact to maintain such alinement during movement of the brake shoe structure, their guiding action being present whether the brake shoe structure moves in a circumferential or radial direction.

Also, the spaced members 28, 29, by suitably shaping their external edge faces relative to the eccentric or pivotal mounting, illustratively as shown in Figures 1 and 4, preferably function as adjustable supports or stops to engage the inner face of the band portion 21ᵃ of the brake shoe structure and thus to coact with the other supports for the brake shoe structure to give the latter substantial concentricity with the inner face of the brake drum 19.

Preferably, also, I provide springs 41, 41, respectively anchored at suitable points to the frame member 14, as by pins, and with their unanchored ends hook-shaped to detachably engage into slots 42, 42 in the webs 21ᵇ and 22ᵇ of the brake shoes. These springs pull inwardly on the brake shoes, tending to contract the brake shoe structure and acting also to press the bearing plate ends 54 and 62 (Figures 1 and 3) against their respective seat members, and in coaction with the above-described cam action of the adjustably displaceable plates 28, 29, substantial concentricity of the brake shoe structure when in contracted position and hence absence of friction or brake wear or of brake drag insured.

I preferably arrange to bring about a braking action by mechanism controllable or actuatable remotely in several different ways, illustratively as by a fluid-actuated means and by a mechanical system or means of actuation. Where fluid actuation is employed, I preferably employ an arrangement better shown in Figure 3. Thus, I may employ a member responsive to fluid pressure, such as oil under pressure, preferably in the form of an expansible and contractable bellows 40 preferably of a suitable sheet metal in cylindrical form and corrugated in known manner. One end of member 40 is secured and sealed to a mounting member 59 having a threaded extension (Figure 3), whereby it may be threaded and sealed into a threaded recess in the lower part of the member 34; mounting member 59 has a central passageway 61 which is thus placed in communication with an aperture 60 in member 34 and extending through the frame part 14ᵇ so that a pipe connection 64 (Figure 2) may be made thereto and extended therefrom to any suitable controllable source of fluid under pressure.

The other or unanchored end of the bellows 40 is secured and sealed to an end closure member 52 which is thus movable toward or away from the member 59 in accordance with the fluid pressure to which the bellows 40 is subjected. The movement of end closure member 52 is communicated, preferably through a distance adjusting means, to the bearing plate 54 of the brake shoe 22 and such a means may comprise a cylindrical or cup-like member 39 internally threaded, as shown, to receive an externally threaded sleeve-like extension 45 of, and preferably formed integrally with the seat member 46, the threaded parts 45 and 39 being interposed so as to transmit the force and movement of the end member 52 of the bellows 40 to the bearing plate 54 of the brake shoe structure (Figure 3) and being of adjustable length by changing the extent to which the one part is threaded into the other, thus to aid in setting or adjusting the several parts relative to one another.

Preferably, I provide means for limiting the contraction of the bellows 40 and also means for guiding its movable end member 52 to maintain the various portions of the bellows 40 always coaxial and against tilting relative to the mounting member 59. Such means may comprise a cup-like member 31 (Figure 3) having an end wall that fits over the end closure 52 to which it may be secured and sealed to form a part thereof and having cylindrical side walls of a length to engage the end face of the mounting member 59 when the bellows 40 is in its contracted condition, thus acting as a stop to limit further contraction. Also, I may employ for acting as a stop an internal extension 52ᵃ of the end closure member 52, that being of a length sufficient to engage the face of the mounting member 59 at the desired limit of contraction of the bellows 40, and preferably part 52 may also act as a valve to close off the passage 61. Preferably coacting with the cylindrical walls of the member 31 is a cylindrical part 33 secured as by welding or brazing to the mounting member 59 and being of an external diameter just about equal to the internal diameter of the part 33, so that these two parts 31 and 33 are in telescopic relation to each other, member 33 having a sufficient axial extent to guide, and to hold against tilting, the member 31 during expansion and contraction of the bellows 40, thus maintaining all portions of the latter always coaxial.

The connection between the movable end of the bellows 40 and the member 39 may be effected in any desired way and illustratively, where member 39 is mounted and arranged to be moved or controlled by other means as well, I may provide the upper end of the member 39 and the movable end structure of the bellows 40 with a suitable connection, preferably universal in character, such as, for example, by providing the movable end structure of the bellows 40 with a concave recess 51 into which is received a convex projection 50 of the member 39. Thus, the force exerted by the bellows may be transmitted to the one end of the brake shoe structure while by providing other means for moving the member 39 the braking effort may be effected through such other means; the latter may comprise a lever 55 preferably mounted to the rear of the frame part 14 (see Figures 2, 3 and 5), and provided with any suitable means, such as an eye 56, for connecting it to suitable means, such as linkages or a foot or hand control, the lever 55 being arranged to effect movement of the member 39.

Preferably, for this latter purpose, member 39 is constructed or formed in the outer end of a rocker arm 44 whose inner or left-hand end, as viewed in Figures 1, 2 and 3, is bifurcated and apertured, a pin or shaft 70, rotatably mounted in suitable bearings in the frame plate 14 and having the operating lever 55 rigidly secured thereto at its outer end, passing through the apertures in the bifurcations in the rocker arm 44 and forming a pivotal support for the rocker arm 44.

Thus, when the brake is actuated by the bellows 40, movement of the end member 39 of the rocker arm 44 takes place along an arc as the rocker arm 44 pivots about the shaft 70. Moreover, suitable means are employed to hold the shaft and the rocker arm 44 against shifting in the direction of the axis of the shaft 70, thus to maintain the intended position of the seat 53 of the seat member 46 (Figure 3) and thereby hold the end of the brake shoe 22 in proper alinement relative to other parts of the apparatus. Rigidly secured to the shaft 70 as by a pin 71 (Figures 3 and 2) is an arm or cam member 57 which may take a shape as shown in Figure 3, the portion of the rocker arm 44 between its bifurcations being suitably shaped to form an appropriate bearing surface to be engaged by the member 57. When actuation of the brake shoe structure takes place by the bellows 40, the rocker arm 44 may freely move in clockwise direction, as viewed in Figure 3, member 57 and the operating lever 55 remaining in their normal or retracted positions, as shown. But when it is desired to achieve brake actuation by the lever 55, as might be the case in the event of failure of the hydraulic or fluid pressure system, lever 55 is moved in clockwise direction (Figure 3) so that member 57 correspondingly moves rocker arm 44 in clockwise direction and in such case the connection 50—51 may be a disconnectable one, member 39 with its connector element 50 simply moving away from the socket element 51 but returning thereto upon retrograde movement of the lever 55 in response to brake-release movement. Thus, either system of control may be utilized and caused to effect brake actuation.

The rear side of the brake structure is preferably provided with a readily detachable closure which, as better appears from Figures 5 and 1, preferably comprises two substantially semi-circular sheet metal plates 65 and 69 which rest flatwise against the outer face of the plate frame 14, being peripherally flanged as at 65ᵃ and 69ᵃ (Figures 1 and 2), respectively, so as to overlap externally the free end of the brake drum 19. The two plates are at their centers cut away, as at 65ᵇ and 69ᵇ, along half circles whose radii are the same as the radius of the bottom of the annular groove 17ᵃ in the hub 17 so as to be received snugly into the groove 17ᵃ whose width is commensurate with the thickness of the two plates. Furthermore, the plates have suitable cut-outs, as at 65ᶜ and 69ᶜ (Figure 5) so that the nut 27 of the stud 26 remains exposed, while plate 65 has a cut-out 65ᵉ and plate 69 has a cut-out 69ᵉ to accommodate, respectively, the pipe connection 60—64 (Figure 2) and the projecting portion of the bearing in member 14 for the actuating shaft 70. These cut-outs are so shaped that upon moving the two plates 65 and 69 toward or away from each other, as viewed in Figure 5, assembly or disassembly thereof with respect to each other and to the frame plate 14 is achieved. Along the line of the diametrically extending continuous edges the upper plate 65 is shaped as at 65ᶠ to interfit with or overlap the corresponding edge of the lower plate 69, thus to weatherproof the junction between the two plates.

Suitable means are employed to hold the plates against separation and such means may comprise springs 66, the tension of which holds the plates against separation. Preferably, the springs are arranged to be readily detachable at least from one of the plates; thus, for example, the lower ends of the springs 66 may be permanently anchored by any suitable means, as at 68, to the lower plate 69 and provided at their upper ends with eye members 67 which may be easily grasped by the hand and upon tensioning the spring (during assembly) engaged over projections or pins provided in the upper plate 69. Ready detachability of the cover plates will thus be seen also to be achieved. The annular groove 17ᵃ insures maintaining the two plates in alinement with each other and against the outer face of the frame member 14 (see Figure 2) while the various parts projecting through the cut-outs in the plates prevent rotary displacement of the assembled plates.

When the externally controlled braking force is exerted against the end of the brake shoe structure, illustratively against the right-hand end of the brake shoe element 22, and with the rotating part or wheel and hence the brake drum 19 rotating clockwise, as viewed in Figures 1 and 3, the brake shoe structure starts moving in clockwise direction and also tends to expand, thus initiating the pressure of the brake lining 32 outwardly against the inner face of drum 19. The direction of application of the force to the one end of the brake shoe structure is such that the force resolves itself into a component acting tangentially or in the general direction of curvature of the brake shoe and another component radially outwardly. The first component has contributed to it the rotary pull of the brake drum on the expanding brake shoe structure, and due to the angularity between the seat member 35 and the brake drum surface, the other end of the brake shoe structure, such as the right-hand end of brake shoe 21, is free to move into that acute angle, the reaction of the parts thus tending to press that end of the brake shoe structure against the brake drum and the angularity being preferably commensurate with the direction of force application at the other end of the brake shoe structure so that the outward radial components are closely equal, thus insuring substantial uniformity of action at the two ends of the brake shoe structure; but due to the expansion generally of the brake shoe structure, the connection 23—24 permitting adequate range of relative swinging between the two brake shoes, substantially uniform braking action throughout the circumferential extent of the brake shoe structure also takes place.

However, should the force applied to the free end of the brake shoe structure be too great or too suddenly applied or too rapidly increased, the brake drum and the rotating part might become quickly or suddenly locked; similarly, should the torque of the brake drum on the brake shoe structure force the other end of the brake shoe structure too rapidly into the acute angle between the seat member 35 and the adjacent surface of the drum, a locking of the drum and rotating part might also result. But as such undesired actions or results tend to come into being, the spring 63 in the member 34 (Figure 3) begins to yield, permitting the seat member 35 to move in a general downward direction to an extent that may vary with the circumstances or with the reaction upon the seat member 35. Thus, pressure or forces which are about to come into being and which would ultimately lock the drum are in part dissipated in compressing the spring 63, but due to the relative angularities, a relatively slight depression or downward movement of the seat member 35 has a relatively large effect in decreasing the radial components not only at that end of the brake shoe structure but, and as a result, also throughout the entire extent of the brake shoe structure. By such coactions as these, an initially excessive externally controlled force is prevented from having a corresponding or proportionate braking effect and is in effect translated into a gradually accelerated braking effect. Furthermore, during any stage of application of the braking force intentional or unintentional abnormalities in force application, as by a hand or foot control, are internally controlled and converted into adequate braking efforts free from the possibility of effecting sudden locking.

Upon release of the braking force, the parts become restored to normal positions, as shown in Figures 1 and 3. Access to the interior of the brake structure is easily gained; the cover plate structure 65—69 is quickly removable, thus exposing such parts as the adjustable seat member 46 for adjustment if necessary. The member 46 may be rotated for adjustment by the use of any convenient tool and for that purpose the periphery of the member 46 may be provided with holes 49 (Figures 1 and 3) to receive a suitable pin or tool to rotate it to desired adjusted position. Any suitable means, such as a spring 47, compressed within and between the parts 46 and 39, may be used to hold the member 46 frictionally against rotation out of adjusted position. The brake shoe structure may be easily removed, requiring no more than the displacement of the plate members 28, 29 into the dotted line position of Figure 1 and the unhooking of the springs 41, 41 whence the brake shoe structure may be simply lifted out, preferably in its sections, from its various seats through the ample space between the brake drum 19 and the frame member 14, and with equal ease replaced.

The construction will thus be seen to be compact, strong and dependable in action and, moreover, lends itself readily to having incorporated into it various other means of actuation. Thus, in Figures 6 and 7, member 34 with its seat member 35 may be mounted on the upper side of a bracket 72 secured to the member 14 by screws 72a. Bearing against the under face 82 of member 72 and slidable therealong is a cam member 73 against whose lower cam edge or face bears a pin or stud 80 anchored in the end of the brake shoe structure.

Cam 73 may be arranged to be moved toward the left or right, as viewed in Figures 6 and 7, as by a flexible cable 78 whose sheath 79 is suitably anchored as at 14e to the mounting frame 14 and whose terminus is anchored, preferably rotatably, to a threaded stud 76 which is in threaded engagement with the threaded head 75 of a pin or stud 74 that extends through a slot 81 in the member 14 and that is secured to the cam 73. A stop pin 77 limits movement toward the left of the cable-actuated stud 76. By cable 78 movement of the cam 73 to apply or release force to the brake shoe structure is achieved, while the coaction of the cam with the guiding surface 82 and with the brake shoe stud 74 may be adjusted by rotating threaded stud 76, thus to shift the cam 73 to the right or left, as may be desired.

In Figure 8, a cam 83, like the cam 73 of Figure 6, coacts between the member 72 and the brake shoe pin 80, being held assembled to the member 14 by a screw 91 threaded into member 14 and passing through a slot 90 in the cam 83; a lever 87, like the lever 55 of Figure 1, actuatable as by a link 88, swings the shaft 86 rotatably supported in the member 14 and hence controls the rotary position of a cam 85 which bears against an adjustable abutment, such as a screw 84 threaded into the cam 83, thus to control the application of force to the brake shoe structure. In Figure 9, the arrangement of Figures 6 and 7 is arranged to be actuated also by a suitable fluid pressure means, such as a cylinder 94 secured to member 14 and having a piston 95 whose piston rod extends through the end closure 96 and is connected to the cam 73, the fluid under pressure, controlled in any suitable manner, entering the chamber 94 through the passage 93.

Referring to Figures 10–13, I have there shown another form of fluid-pressure-responsive means in the form of a bellows 99 providing two opposed yieldable or flexible diaphragms 102 and 103; the interior of the bellows 99 is connected as by a passageway or piping 98, suitably supported by the member 14, to a suitably controlled source of fluid under pressure. A casing-like structure 97, generally cylindrical, encases or is sealed to the peripheries of the diaphragms 102, 103 to form with the latter the bellows 99.

Diaphragm 103 is exposed downwardly to engage a suitably conformed end part 101 of the brake shoe 22 and diaphragm 102 is backed up or supported by suitable means carried by the member 14; such means may comprise a downward extension 100 of the spring and seat-carrying member 34, extension 100 being internally threaded to receive a threaded stud 89 whose detailed structure is somewhat like the member 46 of Figure 3, but whose lower face is convex to expose a relatively large curved surface to the diaphragm 102.

Application of fluid under pressure to the bellows 99 forces the flexible diaphragms 102, 103 apart, and since diaphragm 102 is backed up by the adjustably positioned member 89, diaphragm 103 moves downwardly and applies the force and movement to the brake shoe structure.

Where, as in Figure 12, it is desired that such an arrangement be actuatable also by other externally controlled means, the member 89 is preferably mounted, as by threading, in a rocker arm 106 secured to a shaft 109 that has a bearing in and passes through the frame member 14 and on the other side of which the shaft 109 has attached to it a lever 107 like the lever 55 of Figures 1 and 2. The upper face 105 of rocker arm 106 and the under face 104 of the member 34 are shaped to mate with each other when rocker arm 106 is brought into engagement with the member 34, that being the position of rest of the parts.

Accordingly, when the bellows 99 is used to actuate the brake shoe structure, member 34 acts as a stop for the rocker arm 106, and the reaction of the diaphragms is thus transmitted through rocker arm 106 to the member 34 and hence to the frame part 14. If, however, the brake application is to be achieved by swinging lever 107 in clockwise direction, such actuation carries the rocker arm 106 clockwise away from the member 34, causing the member 89 to press downwardly upon upper diaphragm 102 which is thereby brought into contact with the lower diaphragm 103 so that the brake-applying force is transmitted directly by the member 89 to the end part 101 of the brake shoe structure. Preferably, in the forms of Figures 10, 11 and 12, the housing or casing 97 is preferably mounted to permit movement thereof in a general up and down direction, as seen in the drawings, and conveniently and preferably such a mounting may be arranged by providing a suitable journal or bearing in the member 14 coaxial with the portion of the pipe connection 98 that passes through the member 14, thus to permit pivoting of the casing structure 97, any suitable means, such as a flexible conduit or a stuffing box (not shown), being provided between the oscillatable pipe connection 98 and the source of fluid under pressure.

The diaphragms 102, 103 of Figures 10 and 12 may be made of any suitable material and preferably are made of a suitable sheet metal having suitable tensile strength and flexibility and resiliency. I may, however, construct the bellows of a material like rubber and in such case I may form rubber of suitable tensile strength into a bellows 111 by first giving it the form of a hollow rubber ball, preferably spherical, as indicated by the broken line in Figure 13, and then by deforming two opposite substantially hemispherical portions of the ball to be externally concave, provide two diaphragms 111a and 111b, leaving a substantially band-like or cylindrical part 111c to form a lateral or side wall; to the latter a sealed connection of the tubing or piping, as at 112, may be effected in any suitable way.

Such a bellows structure I preferably encase in a housing preferably of suitable sheet metal and preferably arranged to be telescopic, and it may take the form, as shown in Figure 13, of an upper cylindrical casing section 113 and a lower cylindrical casing section 114, thus enclosing the bellows 111 and with their cylindrical side walls in telescopic relation, as shown, and preferably cut away as at 113a and 114a to accommodate the pipe connection or tubing 112. The casing 113—114 is preferably mounted to be movable, preferably in the manner above described in connection with the casing 97 of Figures 10–12. Member 89 engages the upper wall of the upper casing section 113 and a suitable flat plate-like extension 115 of the brake shoe structure 20 engages the bottom wall of the casing section 114, both thus presenting large areas of contact to the opposite ends of the telescoping casing sections.

Thus, as fluid under pressure is applied to the interior of the bellows 111, to expand the latter, the casing 113—114 supports and backs up the walls of the material of the bellows 111, and expansion of the latter effects movement of separation between the telescoping sections 113 and 114 to effect brake shoe expansion. As in the arrangement of Figure 12, member 89 is preferably carried by the member 106, actuatable as in Figure 12, thus to provide for alternative actuating or control means.

Thus, it will be seen that there has been provided in this invention a brake construction in which the various objects hereinbefore noted, together with many thoroughly practical advantages, are successfully achieved. Assembly and disassembly are rapidly accomplished and for purposes of inspection and repair or replacement of parts, such as the brake lining, in actual use or installation, these factors greatly facilitate such operations. Thus, the cover plate structure 65—69 is easily and quickly taken off and removal of the brake shoe elements, illustratively the two brake shoes 21 and 22, follows upon the simple operation of unhooking the springs 41 from the brake shoes and turning the nut 27 (Figure 2) to move the spacing plates 28, 29 to the dotted line position shown in Figure 1. Thereby the two brake shoes 21 and 22 may at their adjacent ends (Figures 1 and 4) be readily disconnected, as by effecting the relatively small lateral displacement between them and their webs 21b and 22b to ride the part 24 out of the coacting connecting part 23. Thereupon, each brake shoe may be easily disengaged from the seat at its other end; preferably brake shoe 22 (see Figure 1) is first removed, the right-hand end readily disengaging from the seat member 46, and then brake shoe 21 has its right-hand end, as seen in Figure 1, disengaged from the seat member 35, as by moving the brake shoe 21 in counterclockwise direction, and thus to slide its righthand end out from in between the spaced guide flanges 43 of the seat member 35, seat member 35 remaining in position on the member 34. Reassembly follows upon a reverse sequence of these operations. During operation of the device, locking is dependably precluded and abnormalities in manual or other external control will be seen to be converted by the mechanism internally into safe and intended braking effort. In normal or brake-released position of the parts, brake drag or wear is easily guarded against; for example, the easily adjustable seat member 46 in coaction with the spring 41 on the brake shoe 22 coupled with the easily adjustable spacer or cam plates 28, 29 make for ease and dependability of normal setting of brake shoe 22, and though the free end of the brake shoe structure, such as the right-hand end of brake shoe 21 of Figure 1, is arranged to be displaceable toward the brake drum, the setting of the cam plates 28, 29 in coaction with the spring 41 acting upon the brake shoe 21 and the junction 23, 24 between the two brake shoes insure proper setting of the brake shoe 21, while these parts are, as pointed out above, arranged and constructed to permit ease of disassembly or assembly. Furthermore, it will be seen that the brake structure is well adapted for meeting the varying and hard conditions of practical use.

Since my above-mentioned co-pending application Serial No. 265,824, filed April 3, 1939, and of which this application is a continuation in part, discloses much subject matter in common with my present application, I have elected to claim in my present application generic subject matter common to the two applications and in addition to claim herein specifically species subject matter herein disclosed excepting the species disclosed in Figures 6, 7, 8 and 9, the latter species being claimed in my said co-pending application.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:

1. A brake construction comprising a brake drum and a member relative to which the brake drum is rotatable, an expansible brake shoe structure within said brake drum having its two ends terminating in spaced relation, means carried by said member and forming two seats, one for each of said ends of said brake shoe structure and against which seats said ends respectively rest and from which they are readily removable, control means for moving one of said seats in a direction to expand said brake shoe structure against said drum, and means mounting the other seat to make an angle with the brake drum surface such that the thrust on said seat of the end of the brake shoe structure is resolved into a component effective to move said end relative to the seat and against the brake drum, said mounting means including resilient means to permit said seat to yield in response to said thrust and thereby diminish said component of said thrust.

2. A brake construction as claimed in claim 1 in which there is provided means for holding said brake shoe structure, intermediate of its said ends, against displacement in the direction of the axis of the brake drum, and means movably mounting said holding means on said member whereby said holding means may be displaced and moved out of the way to permit assembly or disassembly of the brake shoe structure relative to the drum and said seats.

3. A brake construction as claimed in claim 1 in which said brake shoe structure comprises a plurality of segments having disconnectable connection means at their adjacent ends, and means carried by said member for holding said disconnectable connection means against disconnection.

4. A brake construction as claimed in claim 1 in which said brake shoe structure comprises a plurality of segments having at their adjacent ends disconnectable connections capable of disconnection upon relative displacement between the adjacent segment ends, and means supported by said member for holding adjacent ends of said segments against relative displacement and thereby hold said connections against disconnection.

5. A brake construction comprising a brake drum and a member relative to which the brake drum is rotatable, an expansible brake shoe structure within said brake drum having its two ends terminating in spaced relation, means carried by said member and forming two seats, one for each of said ends of said brake shoe structure and against which seats said ends respectively rest and from which they are readily removable, said brake shoe structure comprising a plurality of segments, said segments each having a web extending in a plane transverse to the axis of said drum, the webs at adjacent ends of said segments having formed thereon companion means forming connections therebetween disconnectable upon relative displacement therebetween in the general direction of the axis of the drum, means movably carried by said member and movable into or out of position relative to said connection means to prevent or permit relative displacement therebetween, and actuating means coacting with said seat-forming means and operable to move at least one of them in a direction to expand said brake shoe structure against said drum.

6. A brake construction comprising a brake drum and a member relative to which the brake drum is rotatable, an expansible brake shoe structure within said brake drum having its two ends terminating in spaced relation, means carried by said member and forming two seats, one for each of said ends of said brake shoe structure and against which seats said ends respectively rest and from which they are readily removable, said brake shoe structure comprising a plurality of segments, said segments each having a web extending in a plane transverse to the axis of said drum, the webs at adjacent ends of said segments having formed thereon companion means forming connections therebetween disconnectable upon relative displacement therebetween in the general direction of the axis of the drum, two spaced elements carried by said member for engagement one on each side of said webs to hold the latter against relative displacement, and actuating means coacting with said seat-forming means and operable to move at least one of them in a direction to expand said brake shoe structure against said drum.

7. A brake construction comprising a brake drum and a member relative to which the brake drum is rotatable, an expansible brake shoe structure within said brake drum having its two ends terminating in spaced relation, means carried by said member and forming two seats, one for each of said ends of said brake shoe structure and against which seats said ends respectively rest and from which they are readily removable, said brake shoe structure comprising a plurality of segments, said segments each having a web extending in a plane transverse to the axis of said drum, the webs at adjacent ends of said segments having formed thereon companion means forming connections therebetween disconnectable upon relative displacement therebetween in the general direction of the axis of the drum, two spaced elements carried by said member for engagement one on each side of said webs to hold the latter against relative displacement, means mounting at least one of said elements for movement into a position to permit said relative displacement, and actuating means coacting with said seat-forming means and operable to move at least one of them in a direction to expand said brake shoe structure against said drum.

8. A brake construction comprising a brake drum and a member relative to which the brake drum is rotatable, an expansible brake shoe structure within said brake drum having its two ends terminating in spaced relation, actuating means carried by said member and operable upon one end of said brake shoe structure to expand the latter against said brake drum, means forming a seat for the other end of said brake shoe structure and having guide means to guide said end for movement therealong and in a direction toward the brake drum, a support carried by said member for said seat-forming means and supporting it so that said direction of movement of said end of said brake shoe structure makes an acute angle with the surface of said brake drum, and yieldable means coacting between said seat-forming means and said support to permit movement of said seat-forming means upon the component of thrust transmitted thereto by the brake shoe structure reaching or exceeding a certain value.

9. A brake construction as claimed in claim 8 in which said yieldable means comprises spring means interposed between said seat-forming means and said support, and means coacting between said support and said seat-forming means to limit the action of said spring means.

10. A brake construction as claimed in claim 8 in which said brake shoe structure comprises a band-like flange for supporting a brake lining and internally directed web means, and means carried by said member and comprising two spaced elements between which said web means extends for holding said brake shoe structure against displacement in the direction of the axis of the brake drum.

11. A brake construction as claimed in claim 8 in which said brake shoe structure comprises a band-like flange for supporting a brake lining and internally directed web means, and means carried by said member and comprising two spaced elements between which said web means extends for holding said brake shoe structure against displacement in the direction of the axis of the brake drum, at least one of said spaced elements having a cam portion for engagement with said band-like flange and has means movably supporting it relative to said member for adjustment.

12. A brake construction comprising a brake drum and a member relative to which the brake drum is rotatable, an expansible brake shoe structure within said brake drum having its two terminal ends terminating in spaced relation, said brake shoe structure comprising a plurality of segments whose adjacent ends carry coacting means forming a disconnectable connection therebetween, means carried by said member and providing two seat-forming means respectively for said two terminal ends and including actuating means operating through at least one of said seat-forming means for expanding said brake shoe structure against said brake drum, the said terminal ends having readily disconnectable engagement with their respective seat-forming means for ready assembly or disassembly, a closure plate structure for an open end of said brake drum, and means detachably supporting said closure plate structure from said member, whereby, upon removal of the latter, said brake shoe structure is readily removable from within said drum.

13. A brake construction comprising a brake drum and a member relative to which the brake drum is rotatable, an expansible brake shoe structure within said brake drum having its two ends terminating in spaced relation, actuating means carried by said member for coacting with the ends of said brake shoe structure to effect expansion of the latter against the brake drum, said actuating means comprising bellows means responsive to a fluid under pressure, said bellows means having telescoping means coacting therewith, there being interposed between said bellows means and said brake shoe structure a means of adjustable length having means movably supporting it from said member.

14. A brake construction comprising a brake drum and a member relative to which the brake drum is rotatable, an expansible brake shoe structure within said brake drum having its two ends terminating in spaced relation, actuating means carried by said member for coacting with the ends of said brake shoe structure to effect expansion of the latter against the brake drum, said actuating means comprising two means arranged serially, one of said two means being responsive to a fluid under pressure and the other having means for mechanically effecting movement thereof, said other of said two means comprising a rocker arm pivotally supported by said member, and said means for mechanically effecting movement comprising means coaxially pivoted with said rocker arm and upon actuation being engageable therewith.

15. A brake construction comprising a brake drum and a member relative to which the brake drum is rotatable, an expansible brake shoe structure within said brake drum having its two ends terminating in spaced relation, means carried by said member comprising means engaging one of said ends for resisting the torque exerted thereby and actuating means for action upon the other of said ends to effect expansion of said brake shoe structure against the brake drum, said actuating means comprising abutment means on said member and spaced from said other end, there being serially interposed between said abutment means and said other end two means, one of which is a rocker arm having means pivotally supporting it relative to said member and the other of which is a means responsive to fluid under pressure, with means for actuating said rocker arm about its pivot.

16. A brake construction as claimed in claim 15 in which the free end of said rocker arm is adjacent said abutment means and in its normal or at rest position engages said abutment means, and in which said fluid-pressure means is interposed between said other end of the brake shoe structure and said rocker arm, whereby the latter, when said fluid-pressure means is actuated, forms in effect part of said abutment means.

17. A brake construction as claimed in claim 15 in which the free end of said rocker arm is adjacent said other end of said brake shoe structure, there being means for transmitting movement of said rocker arm to said other end, said fluid-pressure means being interposed between said rocker arm and said abutment means and when actuated conveying movement to said rocker arm.

18. A brake construction as claimed in claim 15 in which the free end of said rocker arm is adjacent said other end of said brake shoe structure, there being means for transmitting movement of said rocker arm to said other end, said fluid-pressure means being interposed between said rocker arm and said abutment means and when actuated conveying movement to said rocker arm, with means forming a lost motion connection between said rocker arm and its actuating means whereby said fluid-pressure means may move said rocker arm independently of its actuating means.

19. A brake construction as claimed in claim 15 in which the free end of said rocker arm is adjacent said other end of said brake shoe structure, there being means for transmitting movement of said rocker arm to said other end, said fluid-pressure means being interposed between said rocker arm and said abutment means and when actuated conveying movement to said rocker arm, and means forming a disconnectable connection between said rocker arm and said fluid-pressure means to permit movement of said rocker arm by its actuating means independently of said fluid-pressure means.

20. A brake construction as claimed in claim 15 in which said fluid-pressure means has means mounting it in between said rocker arm and said other end of said brake shoe structure and for bodily movement along a substantially arcuate path substantially commensurate with the curved path of movement of the free end of said rocker arm.

21. A brake construction as claimed in claim 15 in which said fluid-pressure means comprises means forming a fluid-receiving chamber having opposed walls at least one of which is movable relative to the other in response to fluid under pressure and which, in the absence of fluid under pressure, are in engagement to transmit directly therethrough the reaction exerted when said rocker arm is actuated to expand said brake shoe structure.

22. A brake construction comprising a brake drum and relatively stationary means relative to which the brake drum is rotatable, an expansible brake shoe structure within said brake drum and comprising a plurality of segments, the adjacent ends of the latter having thereon respectively two interengageable connecting elements forming a disconnectable connection means, said two elements of said segments being constructed for disconnection upon relative displacement between the adjacent segment ends, thereby to disengage one element from the other, actuating means carried by said stationary means for effecting expansion of said brake shoe structure, means carried by said stationary means for holding adjacent ends of said segments against relative displacement without restricting effective movement of said segments in course of expansion of said brake shoe structure against said brake drum and thereby hold said two elements against disengagement during normal operation of the brake construction, means movably supporting said holding means from said stationary means for movement into or out of holding relation to adjacent segment ends, and means for controlling said holding means to effect movement thereof into holding relation to said segments ends or to effect movement thereof out of holding relation to said segment ends to free adjacent ends of said segments for relative displacement, thereby to permit disengagement of said two elements.

23. A brake construction comprising a brake drum, an expansible brake shoe comprising two cooperative shoe segments, a part relative to which said drum is rotatable, connection means on the shoe segments to hold the segments in cooperative relation and capable of disconnection upon relative displacement between the segments, means supporting the free end of one of said shoe segments movably to permit said end to move in a direction toward the brake drum, means movably carried by said part and movable into cooperative relation to said two segments to hold said two segments against relative displacement and without restricting effective movement of said shoe segments in course of expansion thereof against said brake drum and movable out of cooperative relation thereto to permit said relative displacement to take place for effecting disconnection of one shoe segment from the other, and operating means engaging the free end of the other of said segments.

24. A brake construction comprising a brake drum, a brake shoe comprising two cooperative shoe segments, means on the shoe segments to hold the segments in cooperative relation, operating means engaging the free end of one of said segments for effecting brake shoe expansion against said drum, a rest for the other free end of said segments, and resilient means acting upon said rest to permit it to yield in response to force exerted thereon by said brake shoe, said rest making an angle to the surface of the brake drum so that movement of the brake shoe end is resolved into components, one of which is in a direction to cause said resilient means to yield and the other is in a direction toward the brake drum surface.

25. A brake construction comprising a brake drum, a pair of brake shoe segments having means thereon to pivotally join them, a bracket mounted substantially axially of the brake drum, a housing on said bracket, means comprising resilient means in said housing and having a part exposed for engaging the free end of one of said brake shoe segments, pivotally mounted means on said bracket having means for engaging the free end of the other of said brake shoe segments, and means for urging said pivotally mounted means in a direction to urge the brake shoe segments toward the inner surface of the brake drum.

26. A brake construction comprising a brake drum mountable upon a rotatable member, a bracket within the confines of the brake drum, a pair of brake shoes within said brake drum for coaction with the inner surface of the latter and having means hingedly connecting them, a housing on one end of said bracket, a movable member related to said housing, resilient means within said housing and acting against said movable member to urge it away from said housing, means on said movable member to permit slidable action between said movable member and one end of one of said brake shoes, a pivotally mounted arm on said bracket, adjustment means on said arm to engage one end of the other of said brake shoes, operating means for effecting movement of said arm, and resilient means connecting the brake shoes to the bracket and tending to urge them inwardly away from the inner surface of said brake drum.

27. A brake construction comprising a brake drum, a pair of brake shoe segments within said drum, a bracket for supporting said brake shoe segments, a housing on one end of said bracket, said housing carrying a brake-shoe rest and having therein resilient means acting against said rest, said rest having means to engage one end of one of said brake shoe segments, a pivotally mounted rocker arm on said bracket engaging one end of the other of said brake shoe segments, and operating means intermediate said housing and said rocker arm.

28. A brake construction comprising a brake drum having therein an expansible brake shoe, a part relative to which the brake drum is rotatable, said part carrying a support, a rest for receiving thereagainst one end of said brake shoe and having means forming a guideway for guiding said one end of said brake shoe upon movement thereof, means mounting said rest on said support for limited movement toward or away from said support and to position said guideway to guide said one end of said brake shoe, upon movement, in a direction toward or away from said brake drum, and resilient means urging said rest in a direction generally opposed to the direction of thrust of said brake shoe end on said rest, and actuating means carried by said part for exerting a force on the other end of said brake shoe.

29. A brake construction comprising a brake drum having therein an expansible brake shoe, a part relative to which the brake drum is rotatable, said part carrying a support, a rest for one end of said brake shoe, means mounting said rest on said support for limited movement toward or away from said support and resilient means urging said rest in a direction generally opposed to the direction of thrust of said brake shoe end on said rest, and actuating means carried by said part for exerting a force on the other end of said brake shoe, said rest presenting a supporting surface to the brake shoe end that is inclined at an acute angle to the adjacent surface of the brake drum, thereby to resolve the thrust of the brake shoe against said rest into two components, one of which is in a direction toward the brake drum surface and the other is in a direction to cause said resilient means to yield.

30. A brake construction comprising a brake drum having therein an expansible brake shoe, a part relative to which the brake drum is rotatable, said part carrying a support, a rest for one end of said brake shoe, means mounting said rest on said support for limited movement toward or away from said support and resilient means urging said rest in a direction generally opposed to the direction of thrust of said brake shoe end on said rest, and actuating means carried by said part for exerting a force on the other end of said brake shoe, said brake shoe comprising a plurality of segments whose adjacent ends are provided with connections operable to connect or disconnect them upon relative displacement therebetween in the general direction of the axis of the brake drum, and means carried by said part for holding the ends of the brake shoe segments against said relative displacement.

31. A brake construction comprising a brake drum having therein an expansible brake shoe, a part relative to which the brake drum is rotatable, said part carrying a support, a rest for one end of said brake shoe, means mounting said rest on said support for limited movement toward or away from said support and resilient means urging said rest in a direction generally opposed to the direction of thrust of said brake shoe end on said rest, and actuating means carried by said part for exerting a force on the other end of said brake shoe, said actuating means comprising means responsive to fluid pressure and comprising two members, at least one of which is moved relative to the other in response to fluid under pressure, means mounting said two members with at least one of them related to a portion of said support opposite said rest, the other of said members having means for engaging said other end of said brake shoe.

32. A brake construction comprising a brake drum and relatively stationary means relative to which the brake drum is rotatable, an expansible brake shoe structure within said brake drum, and actuating means for effecting expansion thereof against said drum and comprising a hollow body of flexible material initially deformed by flexing at least a portion thereof inwardly to diminish the volume of the interior of the body, controllable means for supplying to the interior of said body a fluid under pressure to flex and move said portion outwardly in response to the effect of said fluid under pressure in increasing said diminished volume, means comprising telescoping sections forming a casing for said body, said sections telescoping one relative to the other in accordance with the movement of said portion of the hollow body, and means for transmitting telescoping movement of said sections as a result of the force and movement exerted by said outwardly movable portion of said body to said brake shoe structure to expand the same.

LOUIS AMBROSE.